(12) United States Patent
Niu et al.

(10) Patent No.: US 10,114,560 B2
(45) Date of Patent: *Oct. 30, 2018

(54) HYBRID MEMORY CONTROLLER WITH COMMAND BUFFER FOR ARBITRATING ACCESS TO VOLATILE AND NON-VOLATILE MEMORIES IN A HYBRID MEMORY GROUP

(71) Applicant: SAMSUNG ELECTRONICS CO., LTD, Suwon-si, Gyeonggi-do (KR)

(72) Inventors: Dimin Niu, Sunnyvale, CA (US); Mu-Tien Chang, Santa Clara, CA (US); Hongzhong Zheng, Los Gatos, CA (US); Sun Young Lim, Gyeonggi-Do (KR); Indong Kim, Kyunggi-Do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/788,501

(22) Filed: Oct. 19, 2017

(65) Prior Publication Data

US 2018/0046388 A1    Feb. 15, 2018

Related U.S. Application Data

(63) Continuation of application No. 15/174,761, filed on Jun. 6, 2016, now Pat. No. 9,830,086.

(Continued)

(51) Int. Cl.
*G06F 13/00*    (2006.01)
*G06F 3/06*    (2006.01)

(52) U.S. Cl.
CPC .......... *G06F 3/0613* (2013.01); *G06F 3/0632* (2013.01); *G06F 3/0647* (2013.01);
(Continued)

(58) Field of Classification Search
CPC .... G06F 3/0616; G06F 3/0629; G06F 3/0673; G06F 12/0246; G06F 2212/7209;
(Continued)

(56) References Cited

U.S. PATENT DOCUMENTS

| 5,218,686 | A | 6/1993 | Thayer |
| 6,038,630 | A * | 3/2000 | Foster ................. G06F 13/1684 709/231 |
| 6,247,093 | B1 | 6/2001 | Shigeno et al. |

(Continued)

OTHER PUBLICATIONS

Internet: Gil, ANANDTECH, Everything You Always Wanted to Know About SDRAM (Memory): But Were Afraid to Ask; Aug. 15, 2010, pp. 1-17.

*Primary Examiner* — Hong C Kim
(74) *Attorney, Agent, or Firm* — Lewis Roca Rothgerber Christie LLP

(57) ABSTRACT

A hybrid memory controller performs receiving first and second central processing unit (CPU) requests to write to/read from a hybrid memory group, identifying a volatile memory device and a non-volatile memory device as a first target and second target of the first and second CPU requests, respectively, by decoding and address mapping of the first and second CPU requests, queuing the first and second CPU requests in first and second buffers, respectively, generating, based on an arbitration policy, a first command corresponding to one of the first and second CPU requests to an associated one of the first and second targets, and generating a second command corresponding to another one of the first and second CPU requests to an associated another one of the first and second targets, and transmitting the first and second commands to respective ones of the volatile and non-volatile memory devices.

21 Claims, 4 Drawing Sheets

Related U.S. Application Data

(60) Provisional application No. 62/303,347, filed on Mar. 3, 2016.

(52) U.S. Cl.
CPC .......... G06F 3/0656 (2013.01); G06F 3/0659 (2013.01); G06F 3/0685 (2013.01)

(58) Field of Classification Search
CPC .... G06F 3/0613; G06F 3/0632; G06F 3/0685; G06F 3/0656; G06F 3/0659; G06F 3/0647
USPC ....... 711/154, 102, 103, 104, 105, 167, 170; 713/2
See application file for complete search history.

(56) References Cited

U.S. PATENT DOCUMENTS

| | | | |
|---|---|---|---|
| 7,120,065 B2 | 10/2006 | Janzen et al. | |
| 7,254,075 B2 | 8/2007 | Woo et al. | |
| 7,885,914 B2 | 2/2011 | Alexander et al. | |
| 8,051,253 B2 | 11/2011 | Okin et al. | |
| 9,213,637 B1 | 12/2015 | Karamcheti et al. | |
| 9,269,437 B2 | 2/2016 | Chen et al. | |
| 9,830,086 B2 * | 11/2017 | Niu | G06F 3/0613 |
| 2008/0126716 A1 * | 5/2008 | Daniels | G06F 12/0875 711/154 |
| 2010/0125695 A1 | 5/2010 | Wu et al. | |
| 2012/0155160 A1 | 6/2012 | Alam et al. | |
| 2012/0159045 A1 | 6/2012 | Hinkle et al. | |
| 2013/0290607 A1 | 10/2013 | Chang et al. | |
| 2015/0279463 A1 | 10/2015 | Berke | |
| 2015/0294698 A1 | 10/2015 | Takefman et al. | |
| 2015/0347151 A1 | 12/2015 | Takefman et al. | |
| 2016/0147467 A1 | 5/2016 | Roberts et al. | |
| 2017/0060434 A1 * | 3/2017 | Chang | G06F 3/0608 |
| 2017/0123727 A1 | 5/2017 | Kim et al. | |
| 2017/0192686 A1 | 7/2017 | Liu et al. | |
| 2017/0255398 A1 * | 9/2017 | Niu | G06F 3/0613 |

* cited by examiner

HYBRID MEMORY CONTROLLER WITH COMMAND BUFFER FOR ARBITRATING ACCESS TO VOLATILE AND NON-VOLATILE MEMORIES IN A HYBRID MEMORY GROUP

CROSS-REFERENCE TO RELATED APPLICATION(S)

This application is a continuation of U.S. patent application Ser. No. 15/174,761, filed Jun. 6, 2016, which claims priority to, and the benefit of U.S. Provisional Application No. 62/303,347 ("An Adaptive Mechanism for Synchronized or Asynchronized Memory Devices"), filed on Mar. 3, 2016, the entire content of which is incorporated herein by reference.

FIELD

Aspects of the present invention relate to the field of memory devices and a mechanism for controlling the same.

BACKGROUND

Computer systems have historically employed a two-tier storage model, which includes a fast, byte-addressable memory (i.e., a volatile memory) device that stores temporary data that is lost on a system halt/reboot/crash, and a slow, block-addressable storage device (i.e., a non-volatile memory device) that permanently stores persistent data, which can survive across system boots/crashes.

Volatile memory devices (also referred to as synchronized memory devices) and non-volatile memory devices (also referred to as asynchronized memory devices) have different timing parameters and employ different communication protocols, which make it difficult to combine the two types of memory devices in one memory space controlled by a single controller. For example, volatile memory devices (such as dynamic random access memory or DRAM) use fixed timing for performing their respective operations (e.g., read/write), while non-volatile memory devices (such as flash memory chips) use variable timing for performing various operations. Non-volatile memory devices are also used in transaction based systems that involve frequent handshakes between the controller and memory device. However, using a volatile memory device in such an environment is generally not efficient as the frequent handshakes lead to reduced bandwidth.

The above information disclosed in this Background section is only for enhancement of understanding of the invention, and therefore it may contain information that does not form the prior art that is already known to a person of ordinary skill in the art.

SUMMARY

Aspects of embodiments of the present invention are directed to an adaptive mechanism of multiplex control logic for synchronized or asynchronized memory devices.

Aspects of embodiments of the present invention are directed to hybrid memory controller for, and a method of, controlling a hybrid memory array including at least one volatile memory device and at least one non-volatile memory device. The volatile and non-volatile memory devices may be at the same control channel or even occupying the same memory rank of a channel.

According to some embodiments of the present invention, there is provided a hybrid memory controller for controlling a hybrid memory array including a volatile memory device and a non-volatile memory device, the hybrid memory controller including: a processor; and a processor memory local to the processor, wherein the processor memory has stored thereon instructions that, when executed by the processor, cause the processor to perform: receiving a first central processing unit (CPU) request to write to/read from the hybrid memory array; identifying the volatile memory device as a first target of the first CPU request by decoding and address mapping of the first CPU request; queuing the first CPU request in a first buffer; receiving a second CPU request to write to/read from the hybrid memory bank; identifying the non-volatile memory device as a second target of the second CPU request by decoding and address mapping of the second CPU request; queuing the second CPU request in a second buffer; generating, based on an arbitration policy, a first command corresponding to one of the first and second CPU requests to an associated one of the first and second targets, and, in response to generating the first command, generating a second command corresponding to another one of the first and second CPU requests to an associated another one of the first and second targets; and transmitting the first and second commands to respective ones of the volatile and non-volatile memory devices.

According to some embodiments of the present invention, there is provided a storage node including: a hybrid memory array including: a non-volatile memory device; and a volatile memory device coupled to the non-volatile memory device; and a hybrid memory controller configured to perform data transfer to/from the volatile and non-volatile memory devices through a same channel, the hybrid memory controller including: a processor; and a processor memory local to the processor, wherein the processor memory has stored thereon instructions that, when executed by the processor, cause the processor to perform: identifying the volatile and non-volatile memory devices by detecting an associated serial presence detect (SPD) data stored in each of the volatile and non-volatile memory devices; receiving a first central processing unit (CPU) request to write to/read from the hybrid memory array; identifying the volatile memory device as a first target of the first CPU request by decoding and address mapping of the first CPU request; queuing the first CPU request in a first buffer; receiving a second CPU request to write to/read from the hybrid memory array; identifying the non-volatile memory device as a second target of the second CPU request by decoding and address mapping of the second CPU request; queuing the second CPU request in a second buffer; determining an arbitration policy based on the SPD data associated with the volatile and non-volatile memory devices; generating, based on the arbitration policy, a first command corresponding to one of the first and second CPU requests to an associated one of the first and second targets, and, in response, generating a second command corresponding to another one of the first and second CPU requests to an associated another one of the first and second targets; and transmitting the first and second commands to respective ones of the volatile and non-volatile memory devices.

According to some embodiments of the present invention, there is provided a method of controlling a hybrid memory array including a volatile memory device and a non-volatile memory device, the method including: receiving, by a processor, a first central processing unit (CPU) request to write to/read from the hybrid memory array; identifying, by the processor, the volatile memory device as a first target of the first CPU request by decoding and address mapping of the first CPU request; queuing, by the processor, the first CPU request in a first buffer; receiving, by the processor, a second CPU request to write to/read from the hybrid memory array; identifying, by the processor, the non-volatile memory device as a second target of the second CPU request by decoding and address mapping of the second CPU request; queuing, by the processor, the second CPU request in a second buffer; generating, by the processor, based on an arbitration policy, a first command corresponding to one of the first and second CPU requests to an associated one of the first and second targets, and, in response, generating a second command corresponding to another one of the first and second CPU requests to an associated another one of the first and second targets; and transmitting, by the processor, the first and second commands to respective ones of the volatile and non-volatile memory devices.

According to some embodiments of the present invention, there is provided a hybrid memory controller for controlling a hybrid memory array comprising a volatile memory device and a non-volatile memory device, the hybrid memory controller including: an address mapper/decoder configured to receive a first central processing unit (CPU) request and a second CPU request to write to/read from the hybrid memory array, to identify the volatile memory device as a first target of the first CPU request by decoding and address mapping of the first CPU request, and to identify the non-volatile memory device as a second target of the second CPU request by decoding and address mapping of the second CPU request; a first transaction queue configured to queue the received first CPU request; a second transaction queue configured to queue the received second CPU request; an arbitrator configured to determine an arbitration policy based on SPD data associated with the volatile and non-volatile memory devices; and a scheduler configured to generate, based on the arbitration policy, a first command corresponding to one of the first and second CPU requests to an associated one of the first and second targets, and to generate a second command corresponding to another one of the first and second CPU requests to an associated another one of the first and second targets, and to transmits the first and second commands to respective ones of the volatile and non-volatile memory devices.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

Figure 1:
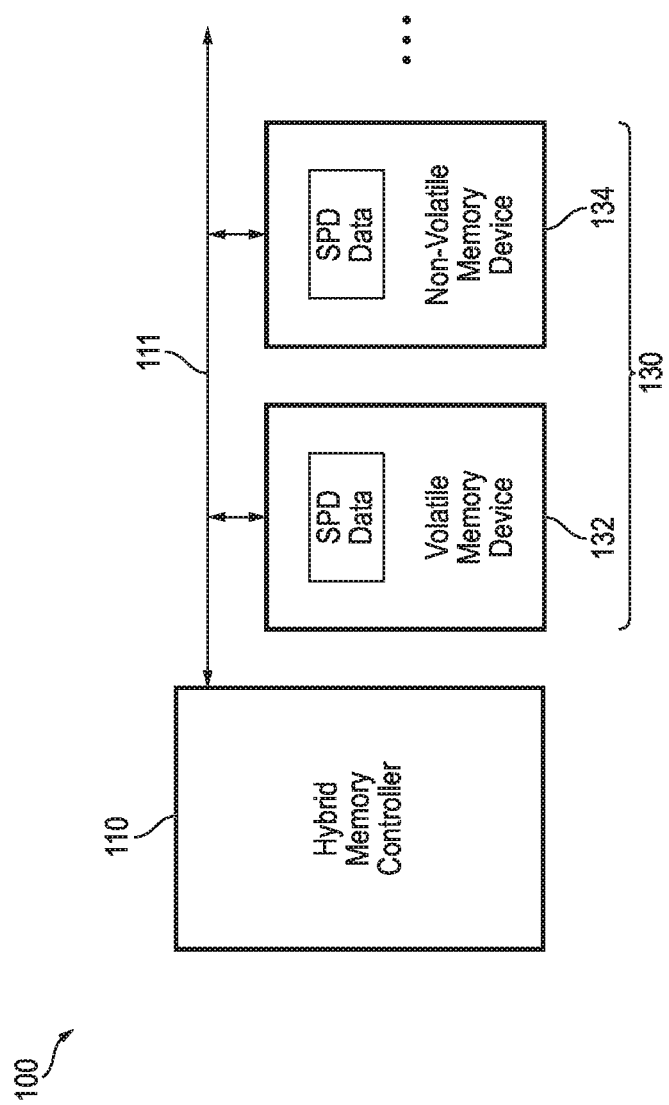
FIG. 1 illustrates a block diagram of a hybrid memory system, according to some embodiments of the present invention.

In the following detailed description, only certain example embodiments of the present invention are shown and described, by way of illustration. As those skilled in the art would recognize, the invention may be embodied in many different forms and should not be construed as being limited to the embodiments set forth herein. Descriptions of features or aspects within each example embodiment should typically be considered as being available for other similar features or aspects in other example embodiments. Like reference numerals designate like elements throughout the specification.

FIG. 1 illustrates a block diagram of a hybrid memory system 100, according to some embodiments of the present invention.

Referring to FIG. 1, the hybrid memory system 100 includes a hybrid memory controller 110 having one or more memory communication channels (hereinafter referred to as "channels"), and a memory group (e.g., a hybrid memory group) 130, which include a volatile memory (VM) device 132 and a non-volatile memory (NVM) device 134 coupled to, and controlled by, the hybrid memory controller 110 through a same channel 111 or existing at the same addressable memory rank. While FIG. 1 shows only a single VM device 132 and a single NVM device 134, this is only for ease of illustration, and embodiments of the present invention are not limited thereto. For example, the hybrid memory system 100 may include a plurality of volatile memories and/or non-volatile memories connected to the hybrid memory controller 110 through the same channel 111 as the VM device 132 and the NVM device 134 and/or through different channels.

In some examples, a volatile memory device 132 (also referred to as a synchronous memory device) may exhibit fixed latency (e.g., fixed read/write timing) and may include a random access memory (RAM), for example, a dynamic RAM (DRAM), static RAM, and/or the like. In some examples, a non-volatile memory device 134 (also referred to as an asynchronous memory device) may exhibit variable latency (e.g., variable read/write timing) and may include NAND memory, NOR memory, vertical NAND memory, resistive memory, phase-change memory, ferroelectric memory, spin-transfer-torque memory, and/or the like.

According to some embodiments, the hybrid memory controller 110 employs an adaptive mechanism of multiplex control logic for controlling synchronized and asynchronized memory devices. In so doing, the hybrid memory controller 110 maps the memory coupled to it by identifying the one or more VM devices 132 and the one or more NVM devices 134 making up the memory group 130 during the initial boot up process through serial presence detect (SPD). The SPD data retrieved (e.g., read) from each of the memory devices identifies the type and capacity of the memory device and provides information about what timings to use (e.g., the time to read or write a byte of data tCL/tWL, and/or the like) to access the particular memory device. The hybrid memory controller 110 operates the VM device 132 and the NVM device 134 differently according to the corresponding SPD readouts.

In some embodiments, the hybrid memory controller 110 manages the rank and/or channel of each volatile memory device 132 using a synchronized timing protocol (e.g., a synchronized DRAM timing protocol) or an asynchronized communication protocol, and manages the rank and/or channel of each non-volatile memory device 134 using an asynchronized communication protocol.

According to some embodiments, the hybrid memory controller 110 may use a standard command set (e.g., a standard DRAM command set) to communicate instructions to each of the VM devices 132, and uses a modified (or re-purposed) standard command set or a new command set to communicate instructions to each of the NVM devices 134.

Figure 2A:
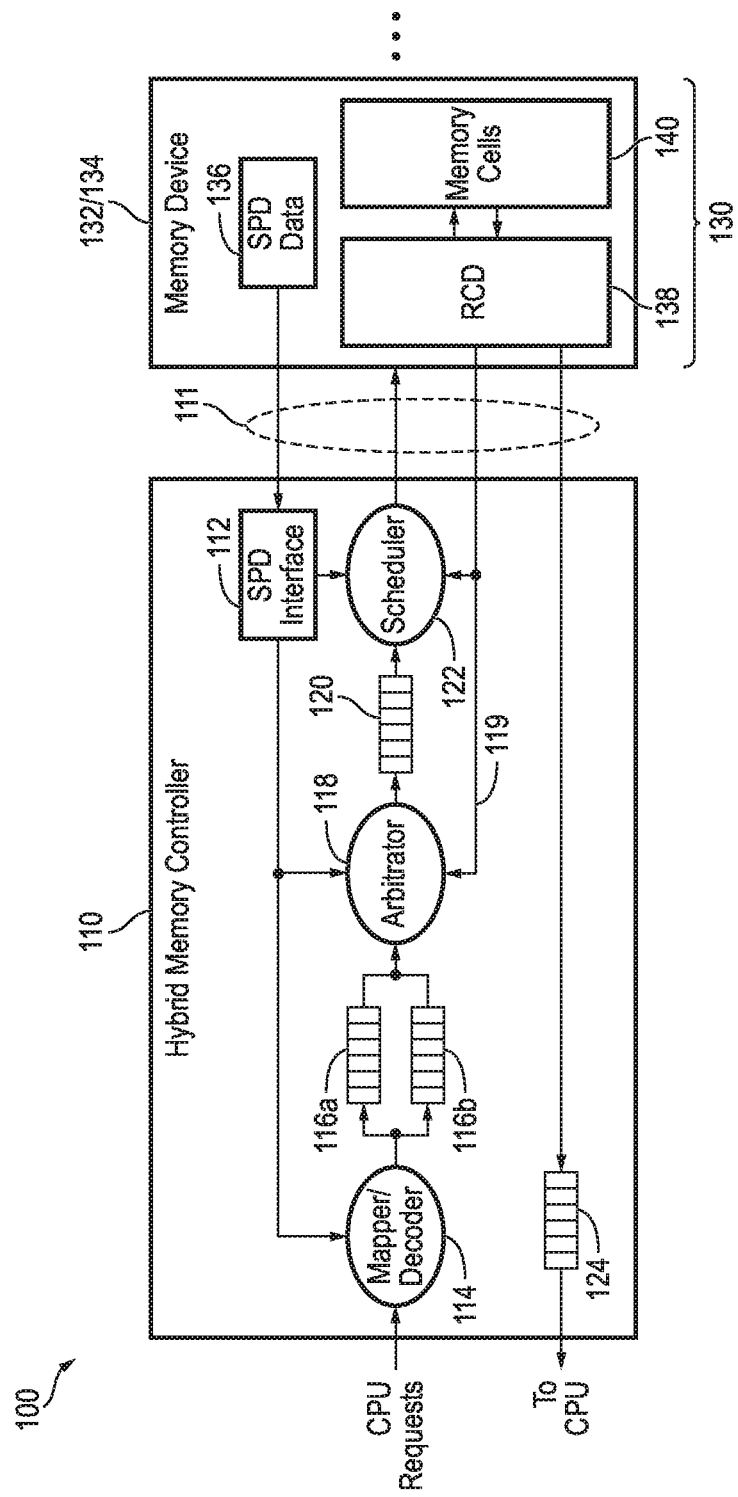
FIG. 2A illustrates a detailed block diagram of a hybrid memory controller in communication with a volatile/non-volatile memory device, according to some embodiments of the present invention.

FIG. 2A illustrates a detailed block diagram of a hybrid memory controller 110 in communication with a VM/NVM device 132/134, according to some embodiments of the present invention.

Referring to FIG. 2A, the hybrid memory controller 110 includes an SPD interface 112, an address mapper/decoder 114, a volatile memory (VM) transaction queue 116a, a non-volatile memory (NVM) transaction queue 116b, an arbitrator 118, a command queue 120, a scheduler 122, and a response queue 124.

During the boot-up process, the SPD interface 112 may retrieve SPD data from the VM/NVM device (also simply referred to as memory device) 132/134, which may be stored in an SPD electrically-erasable programmable read-only memory (EEPROM) 136 of the memory device 132/134.

According to some embodiments, the address mapper/decoder 114 identifies the type of the memory device 132/134, that is, determines whether the memory device 132/134 is a volatile (e.g., synchronous) memory device or a non-volatile (e.g., asynchronous) memory device. The address mapper/decoder 114 decodes a memory address contained within the SPD data into, for example, rank, bank, row, and column IDs (e.g., indices). This may be done by slicing the memory address (e.g., picking a part of the memory address and discarding the rest). In the example of a single memory device per rank, the address mapper/decoder 114 may use rank ID to identify the device type. In the example of hybrid devices (e.g., both VM and NVM devices) at the same rank, the address mapper/decoder 114 may use rank ID and bank ID to identify the device type.

In some embodiments, when the hybrid memory controller 110 receives a request (e.g., a write or read request) from a central processing unit (CPU), the address mapper/decoder 114 decodes the CPU request to determine whether the CPU request maps to an address that corresponds to a VM device 132 or an NVM device 134, and forwards the decoded CPU request to a corresponding one of the VM and NVM transaction queues 116a and 116b.

In some embodiments, the hybrid memory controller 110 uses a dedicated VM transaction queue 116a for storing CPU requests (e.g., VM transaction/requests) directed to a memory address associated with a location of VM device 132, and uses a dedicated NVM transaction queue 116b for storing CPU requests (e.g., NVM transaction/requests) directed to a memory address associated with a location of NVM device 134. As later described in further detail, having separate VM and NVM transaction queues offers arbitration choices to the arbitrator 118 and may enhance the performance of the hybrid memory controller 110. According to some examples, the VM transaction queue 116a may itself include (e.g., be divided into) a plurality of VM transaction queues, each associated with a different VM rank of the memory devices 132. Similarly, the NVM transaction queue 116b may itself include (e.g., be divided into) a plurality of NVM transaction queues, each associated with a different NVM rank of the memory group 130.

The arbitrator 118 determines the processing/fetch order of (e.g., prioritizes) the VM and NVM CPU requests held in respective ones of the VM and NVM transaction queues 116a and 116b according to an arbitration policy, and queues the fetched VM and NVM CPU requests in the command queue 120 according to the determined processing order.

The arbitration policy may be defined and updated by the basic input/output system (BIOS) and/or SPD data during the system boot-up period. For example, the arbitration policy may follow the round-robin protocol (where, e.g., the arbitrator 118 processes a VM CPU request, an NVM CPU request, followed by a VM CPU request, and so on). In some embodiments, the arbitration policy may prioritize entries from the VM transaction queue 116a, as VM devices often have lower access latency than NVM devices. According to some other embodiments, a weighted round-robin arbitration policy that takes into account the unbalanced issue ratio between the VM and NVM transactions. The arbitrator may obtain the NVM and VM timing parameters from the SPD interface 112, and determine a fetching ratio between the VM and NVM transaction queues 116a and 116b. For example, assuming NVM devices have a latency 20 times greater than that of VM Devices, then 20 VM CPU requests may be processed during 1 NVM device activation, as such, the fetching ratio may be set to 20:1.

According to some embodiments, the arbitration policy may be determined based on the status feedback signal 119 received from the memory device 132/134. The status feedback signal 119 may indicate if the memory device 132/134 is available, busy, etc., and in the case of NVM devices 134, may even indicate the operation being performed by the device (e.g., garbage collection or the like), an estimate as to when the operation may conclude, the write credit (e.g., the number of unoccupied entries in the NVM transaction queue 116b), the cache hit/miss rate when there is a cache within the NVM device 134, and/or the like. In some examples, when the status feedback signal 119 indicates that an NVM activation is pending, the arbitrator 118 may reduce the fetch speed from the NVM transaction queue 116b. Further, when the NVM device 134 is busy, the arbitrator 118 my only issue VM requests until the feedback signal 119 indicates that the NVM device is free again. In some examples, when the write credit is large, the arbitrator 118 may increase the speed of issuing the NVM request (e.g., increase the issue ratio of NVM requests to VM requests), and if the write credit is small, the arbitrator my decrease the speed of issuing the NVM request accordingly (e.g., decrease the issue ratio of NVM requests to VM requests).

The scheduler 122 may fetch the transactions queued in the command queue 120 on, for example, a first-in first-out (FIFO) basis. Then, the scheduler 122 uses SPD data (e.g., rank and/or channel ID) corresponding to the fetched transaction (e.g., corresponding to the VM or NVM device 132/134 targeted by the fetched transaction) to generate an appropriate command, which corresponds to the fetched transaction. According to some embodiments, when the fetched transaction is a VM CPU request, VM timing (e.g., DDR4 timing) may be used in generating the corresponding command, and when the fetched transaction is an NVM CPU request, a transaction based communication protocol, such as row address strobe to column address strobe (RAS-CAS) or the like, and specific NVM timing parameters received from the SPD interface 112 may be employed to generate the corresponding command.

According to some embodiments, the scheduler 122 uses the status feedback signal 119 from the memory device 132/134 to schedule NVM commands with appropriate timing. In some embodiments, the scheduler 122 may not use the feedback signal 119 in issuing VM commands as VM devices 132 are synchronous devices and exhibit fixed or preset timing. For example, after activating a memory row, the hybrid memory controller 110 may wait a fixed period of time before issuing a write or read command to write/read the data. However, as NVM devices 134 are asynchronous and exhibit timing that is not fixed, the scheduler 122 uses the feedback signal 119 for timing NVM commands. For example, after activating the NVM device 134, the hybrid memory controller 110 may not know when to issue the subsequent command until it receives the feedback signal 119.

According to some embodiments, the scheduler 122 issues commands to the NVM devices 134 by reusing the standard VM command set (e.g., DRAM command set). For example, the scheduler 122 sends the same activate, read, and write (ACT, RD, and WR) commands to the VM and NVM devices 132 and 134, and a register clock driver (RCD) 138 within the memory device 132/134 interprets the received command according to its device characteristics and performs the associated action (e.g., activate, read from, or write to the memory cells 140).

In some embodiments, the scheduler 122 issues commands to the NVM devices 134 by using a command set that is different from that used with VM devices 132. For example, the scheduler 122 may send standard DDR ACT, RD, and WR commands to the VM devices 132, and may send newly defined ACT_new, RD_new, and WR_new commands to the NVM devices 134. For example, low-high combinations of command pins (e.g., /CS, BG, BA, . . . , A9-0) at the memory device 132/134 that are not already used by the standard command set (e.g., the DDR4 command set) may be used to define a new command set to use with the NVM devices 134. In such embodiments, the NVM devices 134 are modified accordingly to be able to interpret the new command set. According to some embodiments, the new command set may be sent along the same memory bus as the standard VM command set (e.g., the DDR Memory bus).

Data read from the memory device 132/134 by the hybrid controller 110 in response to a CPU read request is stored in a response queue 124 prior to being sent to the system CPU.

Figure 2B:
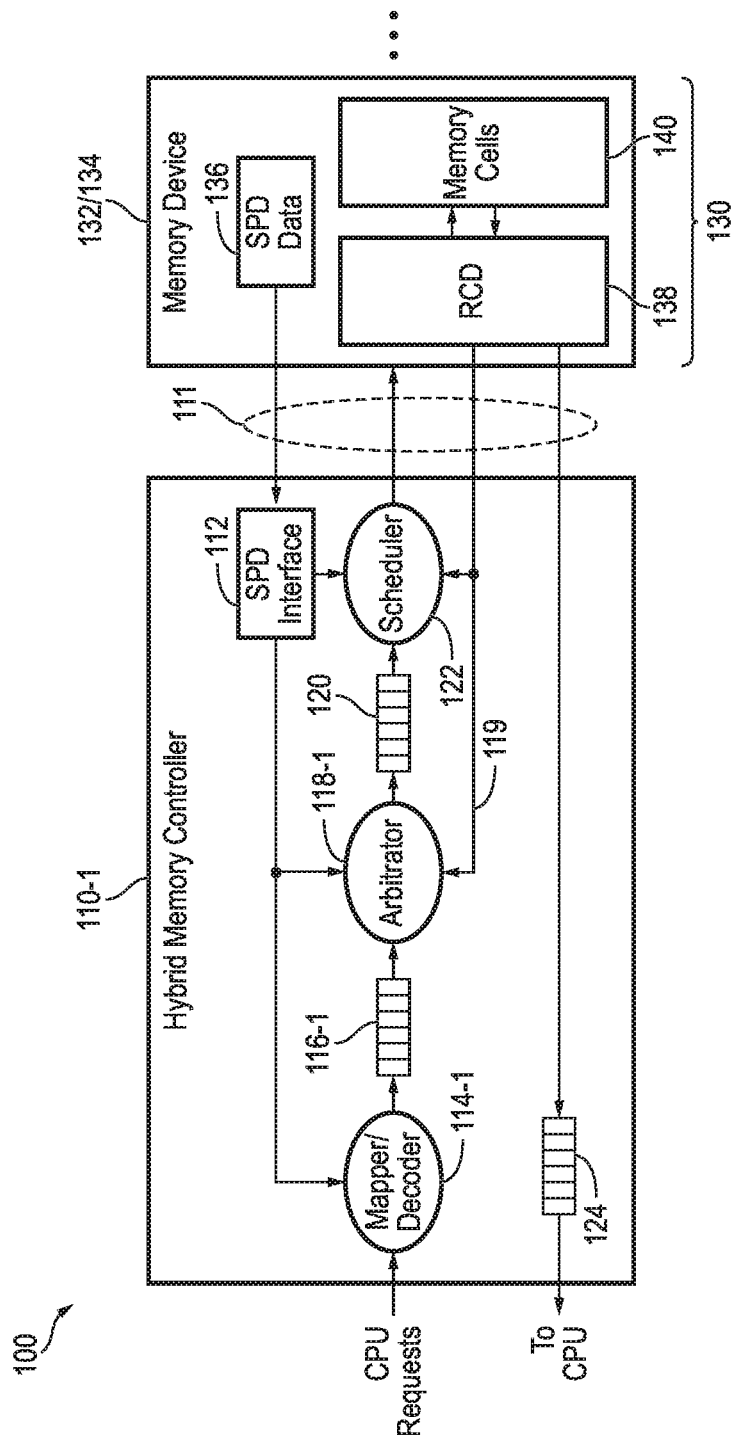
FIG. 2B illustrates a detailed block diagram of a hybrid memory controller, according to some other embodiments of the present invention.

FIG. 2B illustrates a detailed block diagram of a hybrid memory controller 110-1 according to some embodiments of the present invention. The hybrid memory controller 110-1 may be the same or substantially the same as the controller 110 described above with respect to FIG. 2A, except for the hybrid transaction queue 116-1.

Referring to FIG. 2B, rather than use separate transactions queues for queuing the VM and NVM CPU requests, the hybrid memory controller 110-1 uses the hybrid transaction queue 116-1 for storing both types of transactions.

In some embodiments, when the hybrid memory controller 110-1 receives a CPU request (e.g., a write or read request), the address mapper/decoder 114-1 decodes the CPU request to determine whether the CPU request maps to an address that corresponds to a VM device 132 or an NVM device 134, tags the decoded CPU request, as either VM or NVM CPU requests, to identify the corresponding VM or NVM device 132 or 134, and forwards the tagged request to the hybrid transaction queue 116-1.

According to some embodiments, the arbitrator 118-1 processes/fetches VM and NVM CPU requests queued at the hybrid transaction queue 116-1 on a FIFO basis without regard to the type of CPU request. In some other embodiments, the arbitrator 118-1 combs through the queued transactions and uses the tags to identify the VM and NVM requests. The arbitrator 118-1 determines the processing/fetch order of (e.g., prioritizes) the VM and NVM CPU requests according to the arbitration policy described with respect to FIG. 2A, and queues the fetched VM and NVM CPU requests in the command queue 120 according to the determined processing order. The hybrid memory controller 110-1 may then process the transactions queued in the command queue 120 as described above with respect to FIG. 2A.

Figure 3:
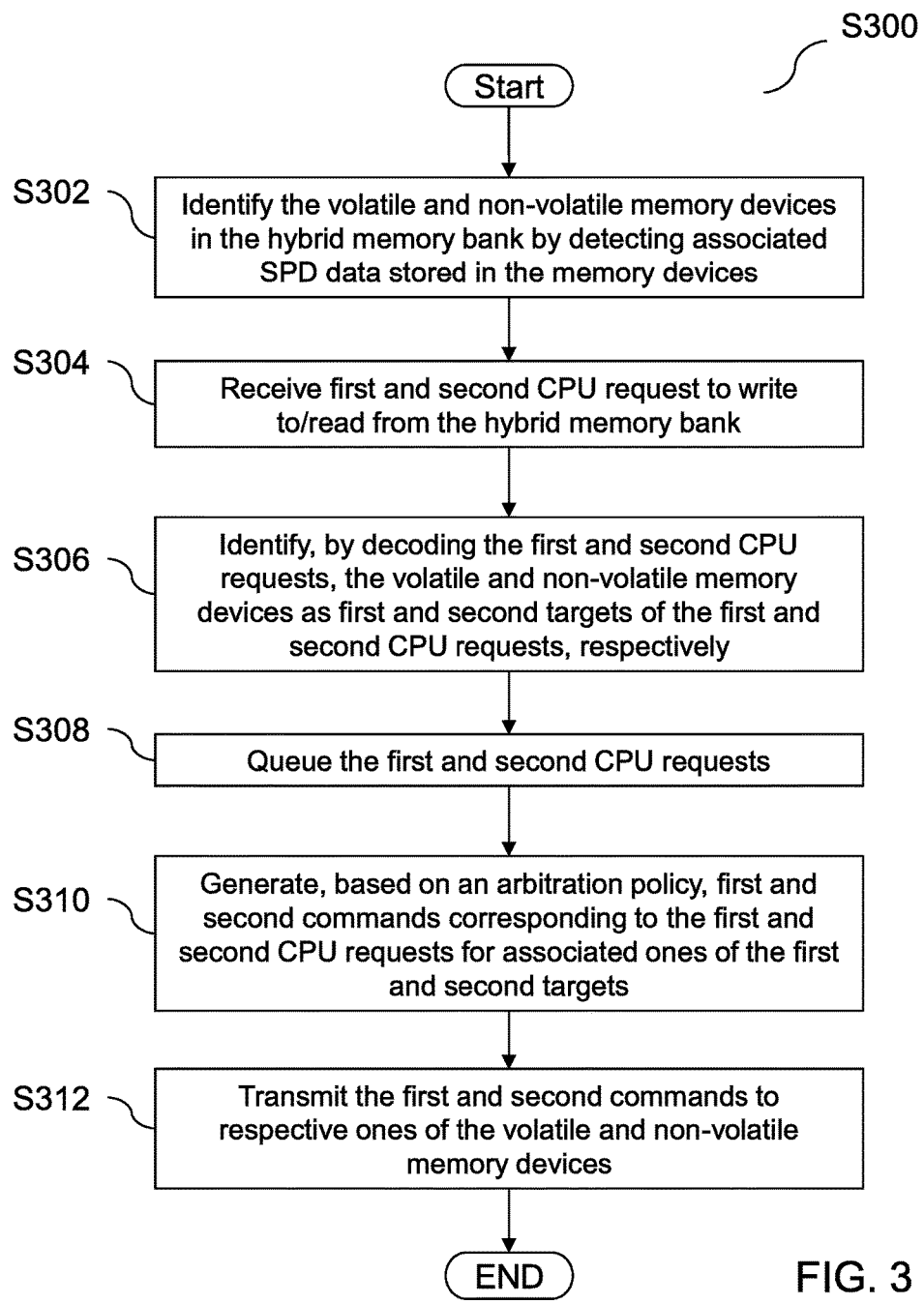
FIG. 3 illustrates a process of controlling a hybrid memory array including the volatile and non-volatile memory devices using the hybrid memory controller, according to some embodiments of the present invention.

FIG. 3 illustrates a process 300 of controlling a hybrid memory group 130 including the volatile memory device 132 and the non-volatile memory device 134 using the hybrid memory controller 110/110-1 according to some embodiments of the present invention.

In act S302, the SPD interface 112 identifies the VM and NVM devices 132 and 134 in the hybrid memory group 130 by detecting an associated SPD data stored in each of the VM and NVM devices (e.g., stored in the corresponding SPD EEPROMs 136). In some examples, the identification of the VM and NVM devices 132 and 134 may include mapping the addresses (e.g., determining the channel, rank, and bank IDs) of the memory devices 132 and 134 and their respective timing parameters (e.g., activation, write, and read times). This process may occur at system boot-up time.

In act S304, the address mapper/decoder 114/114-1 receives a first central processing unit (CPU) request and a second CPU request to write to/read from the hybrid memory group 130.

In act S306, the address mapper/decoder 114/114-1 identifies the VM device as a first target of the first CPU request and identifies the NVM device as a second target of the second CPU request by decoding an address mapping of the first and second CPU requests. In some examples, the VM and NVM devices 132 and 134 may be at different memory ranks of a same memory channel 111. The VM and NVM devices 132 and 134 may also be at different memory banks of a same memory rank.

In act S308, the address mapper/decoder 114/114-1 queues the first CPU request in a first buffer (e.g., the VM transaction queue 116*a*), and queues the second CPU request in a second buffer (e.g., the NVM transaction queue 116*b*). In some examples, the first queue may be dedicated to VM transactions/CPU requests, and the second queue may be dedicated to NVM transactions/CPU requests. In some examples, the dedicated first and second queues may be separate from one another (i.e., have no logical address overlaps). In other embodiments, the first and second queues may make up the same queue (e.g., the hybrid memory queue 116-1).

In act S310, the hybrid memory controller 110/110-1 (e.g., the arbitrator 118/118-1 and the scheduler 122) generates, based on an arbitration policy, a first command corresponding to one of the first and second CPU requests for an associated one of the first and second targets, and then, generates a second command corresponding to another one of the first and second CPU requests for an associated another one of the first and second targets. According to some examples, the arbitration policy may include a round-robin arbitration policy or a weighted round-robin arbitration policy based on unbalanced issue speeds of the first and second queues. In some examples, the arbitrator 118 may determine the arbitration policy based on the timing parameters and/or status feedback signals 119 from the memory devices 132 and 134.

According to some embodiments, the first and second commands may be generated according to the same standard volatile memory command set (e.g., a DDR4 command set). In other embodiments, the first and second commands corresponding to the second target are generated according to a command set different from the standard volatile memory command set.

In act S312, the scheduler 122 transmits the first and second commands to respective ones of the VM and NVM devices 132 and 134.

Accordingly, embodiments of the present invention present an adaptive mechanism of multiplex control logic for synchronized or asynchronized memory devices.

The SPD interface 112, the address mapper/decoder 114/114-1, the transaction and command queues, the arbitrator 118/118-1, and the scheduler 122, and in general, the hybrid memory controller 100/100-1 may be implemented utilizing any suitable hardware (e.g. an application-specific integrated circuit), firmware software, or a suitable combination of software, firmware, and hardware. For example, the various components of the hybrid memory controller 100/100-1, such as the SPD interface 112, the address mapper/decoder 114/114-1, the arbitrator 118/118-1, and the scheduler 122 may be formed on one integrated circuit (IC) chip or on separate IC chips. Further, the various components of the hybrid memory controller 100/100-1 may be a process or thread, running on one or more processors, in one or more computing devices, executing computer program instructions and interacting with other system components for performing the various functionalities described herein. The computer program instructions may be stored in a memory which may be implemented in a computing device using a standard memory device, such as, for example, a random access memory (RAM).

In the following claims, processor and processor memory represent a consolidation of the SPD interface 112, the address mapper/decoder 114/114-1, the arbitrator 118/118-1, the scheduler 122, and the transaction and command queues.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept."

It will be understood that when an element is referred to as being "connected to" or "coupled to" another element, it can be directly connected to or coupled to the other element, or one or more intervening elements may be present. When an element is referred to as being "directly connected to", or "directly coupled to", another element, there are no intervening elements present.

As used herein, the terms "use," "using," and "used" may be considered synonymous with the terms "utilize," "utilizing," and "utilized," respectively.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A hybrid memory controller for controlling a hybrid memory group comprising a volatile memory device and a non-volatile memory device, the hybrid memory controller comprising:
   a processor; and
   a processor memory local to the processor, wherein the processor memory has stored thereon instructions that, when executed by the processor, cause the processor to perform:
      receiving a first central processing unit (CPU) request to write to/read from the hybrid memory group;
      identifying the volatile memory device as a first target of the first CPU request by decoding and address mapping of the first CPU request;
      queuing the first CPU request in a buffer;
      receiving a second CPU request to write to/read from the hybrid memory group;
      identifying the non-volatile memory device as a second target of the second CPU request by decoding and address mapping of the second CPU request;
      queuing the second CPU request in the buffer;
      generating, based on an arbitration policy, a first command corresponding to one of the first and second CPU requests to an associated one of the first and second targets, and, in response to generating the first command, generating a second command corresponding to another one of the first and second CPU requests to an associated another one of the first and second targets; and
      transmitting the first and second commands to respective ones of the volatile and non-volatile memory devices.

2. The hybrid memory controller of claim 1, wherein the instructions further cause the processor to perform:
   identifying the volatile and non-volatile memory devices by detecting an associated serial presence detect (SPD) data stored in each of the volatile and non-volatile memory devices.

3. The hybrid memory controller of claim 2, wherein the identifying of the volatile and non-volatile memory devices occurs at a boot-up time.

4. The hybrid memory controller of claim 2, wherein identifying the volatile and non-volatile memory devices comprises address mapping the volatile and non-volatile memory devices.

5. The hybrid memory controller of claim 2, wherein the instructions further cause the processor to perform:

identifying timing parameters of the volatile and non-volatile memory devices based on the associated SPD data; and determining the arbitration policy based on the timing parameters.

6. The hybrid memory controller of claim 2, wherein the instructions further cause the processor to perform:

receiving a status feedback signal from the non-volatile memory device; and determining the arbitration policy based on the status feedback signal.

7. The hybrid memory controller of claim 1, wherein the arbitration policy comprises a round-robin arbitration policy or a weighted round-robin arbitration policy based on unbalanced issue speeds of the first and second queues.

8. The hybrid memory controller of claim 1, wherein the non-volatile memory device and the volatile memory device are at different memory ranks of a same memory channel.

9. The hybrid memory controller of claim 1, wherein the non-volatile memory device and the volatile memory device are at different memory banks of a same memory rank.

10. The hybrid memory controller of claim 1, wherein the first and second queues are a same queue.

11. The hybrid memory controller of claim 1, wherein the first and second commands are generated according to a same standard volatile memory command set.

12. The hybrid memory controller of claim 1, wherein one of the first and second commands corresponding to the second target is generated according to a command set different from a standard volatile memory command set.

13. A storage node comprising:

a hybrid memory group comprising:

a non-volatile memory device; and a volatile memory device coupled to the non-volatile memory device; and a hybrid memory controller configured to perform data transfer to/from the volatile and non-volatile memory devices through a same channel, the hybrid memory controller comprising:

a processor; and a processor memory local to the processor, wherein the processor memory has stored thereon instructions that, when executed by the processor, cause the processor to perform:

identifying the volatile and non-volatile memory devices by detecting an associated serial presence detect (SPD) data stored in each of the volatile and non-volatile memory devices;

receiving a first central processing unit (CPU) request to write to/read from the hybrid memory group;

identifying the volatile memory device as a first target of the first CPU request by decoding and address mapping of the first CPU request;

queuing the first CPU request in a buffer;

receiving a second CPU request to write to/read from the hybrid memory group;

identifying the non-volatile memory device as a second target of the second CPU request by decoding and address mapping of the second CPU request;

queuing the second CPU request in the buffer;

determining an arbitration policy based on the SPD data associated with the volatile and non-volatile memory devices;

generating, based on the arbitration policy, a first command corresponding to one of the first and second CPU requests to an associated one of the first and second targets, and, in response, generating a second command corresponding to another one of the first and second CPU requests to an associated another one of the first and second targets; and transmitting the first and second commands to respective ones of the volatile and non-volatile memory devices.

14. A method of controlling a hybrid memory group comprising a volatile memory device and a non-volatile memory device, the method comprising:

receiving, by a processor, a first central processing unit (CPU) request to write to/read from the hybrid memory group;

identifying, by the processor, the volatile memory device as a first target of the first CPU request by decoding and address mapping of the first CPU request;

queuing, by the processor, the first CPU request in a buffer;

receiving, by the processor, a second CPU request to write to/read from the hybrid memory group;

identifying, by the processor, the non-volatile memory device as a second target of the second CPU request by decoding and address mapping of the second CPU request;

queuing, by the processor, the second CPU request in the buffer;

generating, by the processor, based on an arbitration policy, a first command corresponding to one of the first and second CPU requests to an associated one of the first and second targets, and, in response, generating a second command corresponding to another one of the first and second CPU requests to an associated another one of the first and second targets; and transmitting, by the processor, the first and second commands to respective ones of the volatile and non-volatile memory devices.

15. The method of claim 14, further comprising:

identifying, by the processor, the volatile and non-volatile memory devices by detecting an associated serial presence detect (SPD) data stored in each of the volatile and non-volatile memory devices;

identifying, by the processor, timing parameters of the volatile and non-volatile memory devices based on the associated SPD data; and determining, by the processor, the arbitration policy based on the timing parameters.

16. The method of claim 14, further comprising:

receiving, by the processor, a status feedback signal from the non-volatile memory device; and determining, by the processor, the arbitration policy based on the status feedback signal.

17. The hybrid memory controller of claim 14, wherein the non-volatile memory device and the volatile memory device are at different memory ranks of a same memory channel.

18. The hybrid memory controller of claim 14, wherein the non-volatile memory device and the volatile memory device are at different memory banks of a same memory rank.

19. The hybrid memory controller of claim 14, wherein the first and second commands are generated according to a same standard volatile memory command set.

20. The hybrid memory controller of claim 14, wherein one of the first and second commands corresponding to the second target is generated according to a command set different from a standard volatile memory command set.

21. A hybrid memory controller for controlling a hybrid memory group comprising a volatile memory device and a non-volatile memory device, the hybrid memory controller comprising:
- an address mapper/decoder configured to receive a first central processing unit (CPU) request and a second CPU request to write to/read from the hybrid memory group, to identify the volatile memory device as a first target of the first CPU request by decoding and address mapping of the first CPU request, and to identify the non-volatile memory device as a second target of the second CPU request by decoding and address mapping of the second CPU request;
- a transaction queue configured to queue the received first CPU request and the received second CPU request;
- an arbitrator configured to determine an arbitration policy based on SPD data associated with the volatile and non-volatile memory devices; and
- a scheduler configured to generate, based on the arbitration policy, a first command corresponding to one of the first and second CPU requests to an associated one of the first and second targets, and to generate a second command corresponding to another one of the first and second CPU requests to an associated another one of the first and second targets, and to transmits the first and second commands to respective ones of the volatile and non-volatile memory devices.

* * * * *